US008699610B2

(12) United States Patent
Xu et al.

(10) Patent No.: US 8,699,610 B2
(45) Date of Patent: Apr. 15, 2014

(54) FEEDBACK SCHEME FOR MULTI-CELL INTERFERENCE MITIGATION CONSIDERATION LEGACY MOBILE USERS

(75) Inventors: Jian Xu, Anyang-si (KR); Ja Ho Koo, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 13/388,019

(22) PCT Filed: Feb. 17, 2010

(86) PCT No.: PCT/KR2010/000981
§ 371 (c)(1),
(2), (4) Date: Jan. 30, 2012

(87) PCT Pub. No.: WO2011/013887
PCT Pub. Date: Feb. 3, 2011

(65) Prior Publication Data
US 2012/0128050 A1    May 24, 2012

Related U.S. Application Data

(60) Provisional application No. 61/230,078, filed on Jul. 30, 2009.

(51) Int. Cl.
*H04B 7/02* (2006.01)
(52) U.S. Cl.
USPC ........... 375/267; 375/260; 375/262; 375/271; 375/295; 375/316
(58) Field of Classification Search
USPC ......... 375/224, 229, 260, 262, 267, 271, 295, 375/299, 301, 316, 332, 340, 342, 346, 350
See application file for complete search history.

(56) References Cited

U.S. PATENT DOCUMENTS

| | | | |
|---|---|---|---|
| 8,238,954 B2 * | 8/2012 | Liu et al. | 455/501 |
| 8,249,511 B2 * | 8/2012 | Liu et al. | 455/63.1 |
| 8,488,480 B2 * | 7/2013 | Han et al. | 370/252 |
| 8,493,914 B2 * | 7/2013 | Lee et al. | 370/328 |
| 2007/0098099 A1 | 5/2007 | Gore et al. | |

(Continued)

*Primary Examiner* — Hirdepal Singh
(74) *Attorney, Agent, or Firm* — McKenna Long & Aldridge LLP

(57) ABSTRACT

The present invention relates to a Multi-Input Multi-Output (MIMO) communication system and more particularly, to a method for precoding matrix index (PMI) restriction/recommendation in a multi-cell wireless communication system. A method of codebook based precoding matrix index (PMI) feedback considering legacy mobile stations in a multi-cell wireless communication system comprises measuring a channel from at least one neighboring base station generating interference with a signal received from a serving base station; determining a first PMI in which the interference is maximized from PMIs included in a first codebook, wherein the first PMI is determined based on the measured channel; determining a first PMI group including PMIs having high correlation to the first PMI from the PMIs included in the first codebook; determining a second PMI in which the interference is maximized from PMIs included in a second codebook, where in the second codebook is for the legacy mobile stations; determining a second PMI group including PMIs having high correlation to the second PMI from the PMIs included in the second codebook; and transmitting feedback information including the first PMI, a first subset bit indicating the first PMI group, the second PMI and a second subset bit indicating the second PMI group to the serving base station.

19 Claims, 5 Drawing Sheets

(56) References Cited

U.S. PATENT DOCUMENTS

| | | |
|---|---|---|
| 2007/0165738 A1* | 7/2007 | Barriac et al. ............... 375/267 |
| 2007/0217540 A1 | 9/2007 | Onggosanusi et al. |
| 2008/0247475 A1* | 10/2008 | Kim et al. .................... 375/260 |
| 2009/0325590 A1* | 12/2009 | Liu et al. .................... 455/452.2 |
| 2009/0325591 A1* | 12/2009 | Liu et al. .................... 455/452.2 |
| 2010/0232539 A1* | 9/2010 | Han et al. ...................... 375/285 |
| 2011/0034192 A1* | 2/2011 | Lim et al. ...................... 455/501 |
| 2011/0039547 A1* | 2/2011 | Van Rensburg et al. ...... 455/423 |

* cited by examiner

FEEDBACK SCHEME FOR MULTI-CELL INTERFERENCE MITIGATION CONSIDERATION LEGACY MOBILE USERS

This application is a 35 U.S.C. §371 National Stage entry of International Application No. PCT/KR2010/000981, filed on Feb. 17, 2010, and claims the benefit of U.S. Provisional Application No. 61/230,078, filed Jul. 30, 2009, both of which are incorporated by reference in their entirety herein.

TECHNICAL FIELD

The present invention relates to a Multi-Input Multi-Output (MIMO) communication system and more particularly, to a method for precoding matrix index (PMI) restriction/recommendation in a multi-cell wireless communication system.

BACKGROUND ART

With the popularization of information communication services, the emergence of various multimedia services, and the provision of high-quality services, demand for a wireless communication service has rapidly increased. To actively cope with such demand, the capacity of a communication system should be increased and the reliability of data transmission should be improved.

To increase communication capacity in wireless communication environments, a method for newly searching available frequency bands and a method for increasing efficiency for limited resources may be considered. As to the latter method, a multiple-input multiple-output (MIMO) scheme has recently drawn attention and has been actively developed. The MIMO scheme obtains a diversity gain by equipping a transmitter and a receiver with a plurality of antennas to additionally ensure a spatial region for utilizing resources, or increases transmission capacity by transmitting data in parallel via the plurality of antennas.

Generally, the MIMO scheme is considered to raise the reliability of a communication system or to improve transmission efficiency and may be classified into beamforming, spatial diversity, and spatial multiplexing schemes.

The beamforming scheme and spatial diversity scheme, which use multiple transmit antennas to raise reliability, transmit a single data stream through multiple transmit antennas. The spatial multiplexing scheme, used to raise transmission efficiency, simultaneously transmits multiple data streams via multiple transmit antennas.

In the spatial multiplexing scheme, the number of simultaneously transmitted data streams is called a spatial multiplexing rate. The spatial multiplexing rate should be appropriately selected according to the number of transmit and receive antennas and to a channel state. Generally, the spatial multiplexing rate which can maximally be obtained is limited to a smaller value of the number of transmit antennas and the number of receive antennas. If correlation of a channel is increased, a low spatial multiplexing rate is used.

When employing the spatial multiplexing scheme, various gains can be obtained by applying a virtual antenna signaling scheme. For example, since channel environment of multiple data streams become the same by application of the virtual antenna signaling scheme, robust channel quality information (CQI) can be provided and the reliability of a data stream having a bad channel state can be increased.

Further, a transmit power of physical antennas to which a virtual antenna signaling scheme is applied can be nearly uniformly maintained. In more detail, sets of physical transmit antennas form a plurality of beams each corresponding to a virtual antenna. Different beams are generated not only to transmit the same power from all the physical antennas but also to reserve a channel characteristic.

The total number of virtual antennas determines an available spatial diversity or spatial multiplexing rate. Moreover, the total number of virtual antennas determines the amount of overhead required to measure space channels. Hereinbelow, the number of physical transmit antennas is denoted by Mr, the number of available virtual transmit antennas is denoted by Me, and the number of simultaneously transmitted layers is denoted by M. The layer indicates a transmission symbol which is independently coded and modulated for transmission.

Meanwhile, a precoding scheme refers to a spatial processing scheme to raise the reliability of a communication system and to improve transmission efficiency. The precoding scheme can be used irrespective of a spatial multiplexing rate in a multiple antenna system and increases a signal-to-noise ratio (SNR) of a channel. Examples of the precoding scheme include a codebook-based precoding scheme, which is used when feedback information is limited in a closed-loop system, and a scheme in which channel information is quantized and fed back. In the codebook-based precoding, the receiving end feeds an index of a precoding matrix, which is already known to both the receiving end and the transmitting end, back to the transmitting end to achieve an SNR gain.

In the 4th generation wireless communication systems, multi-cell interference is a big problem to be solved. PMI restriction or recommendation for the neighbor cells is a good scheme to handle the problem.

In this case, an efficient feedback scheme of PMI sets is required especially for the scenario in which the set of PMIs of the legacy mobile users with 4Tx antennas is restricted or recommended together with the PMIs of the mobile users with 8Tx antennas.

DISCLOSURE

Technical Problem

An object of the present invention is to provide a method of feedback PMI sets considering legacy mobile stations in a multi-cell environment.

Another object of the present invention is to provide an efficient method of feedback PMI sets with less signaling overhead.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

To solve the aforementioned technical problems, according to one embodiment of the present invention, a method of codebook based precoding matrix index (PMI) feedback considering legacy mobile stations in a multi-cell wireless communication system comprises measuring a channel from at least one neighboring base station generating interference with a signal received from a serving base station; determining a first PMI in which the interference is maximized from PMIs included in a first codebook, wherein the first PMI is determined based on the measured channel; determining a first PMI group including PMIs having high correlation to the first PMI from the PMIs included in the first codebook; determining a second PMI in which the interference is maximized from PMIs included in a second codebook, where in the second codebook is for the legacy mobile stations; determining a second PMI group including PMIs having high correlation to the second PMI from the PMIs included in the second codebook; and transmitting feedback information including the first PMI, a first subset bit indicating the first PMI group, the second PMI and a second subset bit indicating the second PMI group to the serving base station.

In this case, the second PMI is determined based on the measured channel.

Aldo, the second PMI is determined based on calculation as Equation a below.

$$w_8 \approx Cw_4,$$ [Equation a]

Where $W_8$, $W_4$ and C indicate the first PMI, the second PMI and a pre-determined virtual matrix, respectively.

Also, determining the first PMI group comprises calculating respective first cross-correlation values between the first PMI and the PMIs included in the first codebook; determining n1 level group and n2 level group based on the cross-correlation calculation, wherein the n1 level group includes PMIs having the largest cross-correlation value and wherein the n2 level group includes PMIs having the second largest cross-correlation value; and determining the first PMI group by including the n1 level group only or both the n1 level group and the n2 level group based on the first cross-correlation calculation.

Also, determining the second PMI group comprises calculating respective second cross-correlation values between the second PMI and the PMIs included in the second codebook; determining m1 level group and m2 level group based on the cross-correlation calculation, wherein the m1 level group includes PMIs having the largest cross-correlation value and wherein the m2 level group includes PMIs having the second largest cross-correlation value; and determining the second PMI group by including the m1 level group only or both the m1 level group and the m2 level group based on the second cross-correlation calculation.

Also, the first subset bit and the second subset bit are included in a PMI_coordination subset field of a feedback header.

Also, the first subset bit is set to '0' if only the n1 level group is included in the first PMI group, and the first subset bit is set to '1' if both the n1 level group and the n2 level group are included in the first PMI group.

Also, the second subset bit is set to '0' if only the m1 level group is included in the second PMI group, and the second subset bit is set to '1' if both the m1 level group and the m2 level group are included in the second PMI group.

Moreover, first subset bit and the second subset bit are included in the PMI_coordination subset field as a bitmap information.

To solve the aforementioned technical problems, according to one embodiment of the present invention, a method of codebook based precoding matrix index (PMI) feedback for a serving base station considering legacy mobile stations in a multi-cell wireless communication system comprises receiving feedback information including a first PMI, a first subset bit indicating a first PMI group, a second PMI and a second subset bit indicating a second PMI group from a mobile station; and transmitting the feedback information to at least one neighboring base station, wherein the first PMI is a PMI in which channel interference between the serving base station and the at least one neighboring base station is maximized among PMIs included in a first codebook, and the second PMI is a PMI in which the interference is maximized among PMIs included in a second codebook for the legacy mobile stations, and wherein the first PMI group includes PMIs having high correlation to the first PMI among the PMIs included in the first codebook, and the second PMI group includes PMIs having high correlation to the second PMI among the PMIs included in the second codebook.

In this case, the second PMI is determined based on calculation as Equation a below.

$$w_8 \approx Cw_4,$$ [Equation a]

Where $W_8$, $W_4$ and C indicate the first PMI, the second PMI and a pre-determined virtual matrix, respectively.

To solve the aforementioned technical problems, according to one embodiment of the present invention, a mobile station that supports codebook based precoding matrix index (PMI) feedback in a multi-cell wireless communication system comprises a processor; and a radio frequency (RF) module for transmitting and receiving a radio signal to and from the outside under the control of the processor. Here, the processor is configured to measure a channel from at least one neighboring base station generating interference with a signal received from a serving base station; determine a first PMI in which the interference is maximized from PMIs included in a first codebook, wherein the first PMI is determined based on the measured channel; determine a first PMI group including PMIs having high correlation to the first PMI from the PMIs included in the first codebook; determine a second PMI in which the interference is maximized from PMIs included in a second codebook, where in the second codebook is for the legacy mobile stations; determine a second PMI group including PMIs having high correlation to the second PMI from the PMIs included in the second codebook; and control the RF module to transmit feedback information including the first PMI, a first subset bit indicating the first PMI group, the second PMI and a second subset bit indicating the second PMI group to the serving base station.

In this case, the processor determines the second PMI based on calculation as Equation a below.

$$w_8 \approx Cw_4,$$ [Equation a]

Where $W_8$, $W_4$ and C indicate the first PMI, the second PMI and a pre-determined virtual matrix, respectively.

Also, the processor is further configured to calculate respective first cross-correlation values between the first PMI and the PMIs included in the first codebook; determine n1 level group and n2 level group based on the cross-correlation calculation, wherein the n1 level group includes PMIs having the largest cross-correlation value and wherein the n2 level group includes PMIs having the second largest cross-correlation value; and determine the first PMI group by including the n1 level group only or both the n1 level group and the n2 level group based on the first cross-correlation calculation.

Also, the processor is further configured to calculate respective second cross-correlation values between the second PMI and the PMIs included in the second codebook; determine m1 level group and m2 level group based on the cross-correlation calculation, wherein the m1 level group includes PMIs having the largest cross-correlation value and wherein the m2 level group includes PMIs having the second largest cross-correlation value; and determine the second PMI group by including the m1 level group only or both the m1 level group and the m2 level group based on the second cross-correlation calculation.

Also, the first subset bit and the second subset bit are included in a PMI_coordination subset field of a feedback header.

Also, the processor sets the first subset bit to '0' if only the n1 level group is included in the first PMI group, and the processor sets the first subset bit to '1' if both the n1 level group and the n2 level group are included in the first PMI group.

Also, the processor sets the second subset bit to '0' if only the m1 level group is included in the second PMI group, and the processor sets the second subset bit to '1' if both the m1 level group and the m2 level group are included in the second PMI group.

Moreover, the first subset bit and the second subset bit are included in the PMI_coordination subset field as a bitmap information.

Advantageous Effects

According to the embodiments of the present invention, the following advantages can be obtained.

First, a mobile station is able to transmit information of PMI subset for PMI recommendation or restriction of interfering base stations.

Second, PMI restriction or recommendation for legacy mobile stations can be carried out efficiently by adding 1 bit to the feedback information.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Figure 1:
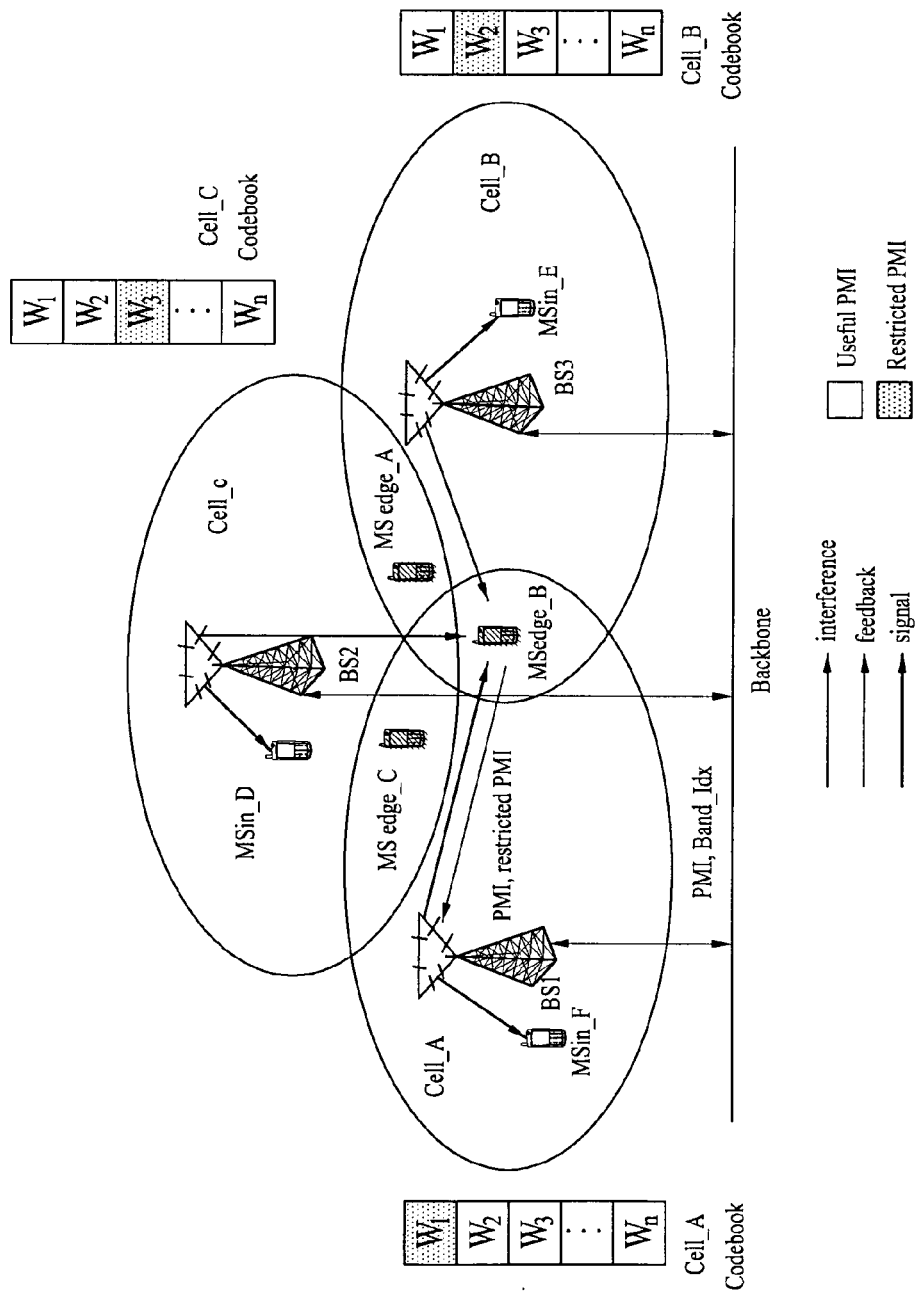
FIG. 1 illustrates an example for the operation principle of a general PMI restriction/recommendation scheme.

The present invention relates a wireless access system. Hereinafter, methods of feedback for a mobile station in accordance with the embodiments of the present invention will be described.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a terminal.

Furthermore, a transmitter means a fixed and/or mobile node that transmits data service or voice service, and a receiver means a fixed and/or mobile node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station include a personal digital assistant (PDA), a hand-held PC, a notebook PC, a smart phone, and a multi mode-multi band (MM-MB) terminal.

In this case, the smart phone means a terminal having advantages of a mobile communication terminal and a personal mobile terminal in combination. Namely, the smart phone can mean a terminal that data communication functions such as schedule management, facsimile transmission and reception, and Internet access, which correspond to functions of the personal mobile terminal, are added to the mobile communication terminal. Also, the multi mode-multi band terminal means a mobile terminal having a multi-modem chip to be operated in a portable Internet system and other mobile communication systems (for example, code division multiple access (CDMA) 2000 system, WCDMA system, etc.).

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Hereinafter, the preferred embodiments according to the present invention will be described in detail with reference to the accompanying drawings. It is to be understood that the detailed description which will be disclosed together with the accompanying drawings is intended to describe exemplary embodiments of the present invention and is not intended to describe unique embodiments by which the present invention can be carried.

Furthermore, specific terminologies hereinafter described are provided to assist understanding of the present invention, and various modifications can be made in the specific terminologies within the range that they do not depart from technical spirits of the present invention.

The present invention suggests an efficient PMI recommendation/restriction scheme by adding additional bits indicating PMI subset group.

It is well known that closed-loop MIMO may enhance the average user-throughput and cell-edge throughput in the multi-cell environments. However cell-edge area users are still vulnerable to the inter-cell interference from adjacent cells. In particular, the usage of certain subset of codebook can give a bad influence on the neighboring cell-edge users, which results in the basic PMI restriction/recommendation scheme to obtain increased DL throughput and reduce inter-cell interference. In the scheme, the usage of codebook subsets is restricted/recommended for the inner cell users in the interfering cells based on cell edge UEs' restricted/recommended PMI feedback information.

FIG. 1 illustrates an example for the operation principle of a general PMI restriction/recommendation scheme.

Referring to FIG. 1, the restricted/recommended PMI is expressed as dark in the codebook for pre-coding and all base stations (BSs) are connected via the backbone network. In the figure, it is assumed that all base stations use the same codebook for pre-coding. MSedge_B means the cell-edge user located at the cell_A boundary and affected by the neighboring cells (cell_B and cell_C). The other MSs (MSin_D, MSin_E and MSin_F) that receive a high transmit power signal are located at the inner side of each cell. In the PMI restriction/recommendation scheme, the MSedge_B searches the optimal/least PMIs from the reference signals of the interfering BSs (BS_2, BS_3) and feedbacks them to the serving BS (BS_1). And the serving BS (BS_1) transfers the PMI restriction/recommendation information to the corresponding interfering BSs (BS_2, BS_3) through the backbone network. If the BS_2 located in Cell_C receives the PMI restriction/recommendation information from the serving BS (BS_1), it does not allocate the restricted PMI or allocate the least PMI to the inner MSs.

Hereinafter, a system to which a general technique including the IEEE 802.16e specification is applied will be referred to as a 'legacy system'. An MS to which a legacy technique is applied and can be served by up to 4Tx antennas will be referred to as a 'yardstick MS (YMS)' or a 'legacy MS', and a BS to which a legacy technique is applied will be referred to as a 'legacy BS' or 'yardstick BS (YBS)'.

Meanwhile, an MS and a BS to which a more advanced technique supporting up to 8Tx antennas, including the IEEE 802.16m specification (wirelessMAN-OFDMA advanced system), than a general technique is applied will be referred to as an 'advanced MS (AMS)' and an 'advanced BS (ABS)', respectively.

In the following description, it is assumed that a legacy system is an IEEE 802.16e system and an advanced system is an IEEE 802.16m system.

The optimization scheme according to the present invention will be described based on a method of PMI restriction. However, the present invention is not limited to the above method and may also be applied to a method of PMI recommendation.

According to one embodiment of the present invention, a method of PMI restriction feedback considering legacy mobile stations is provided.

Figure 2:
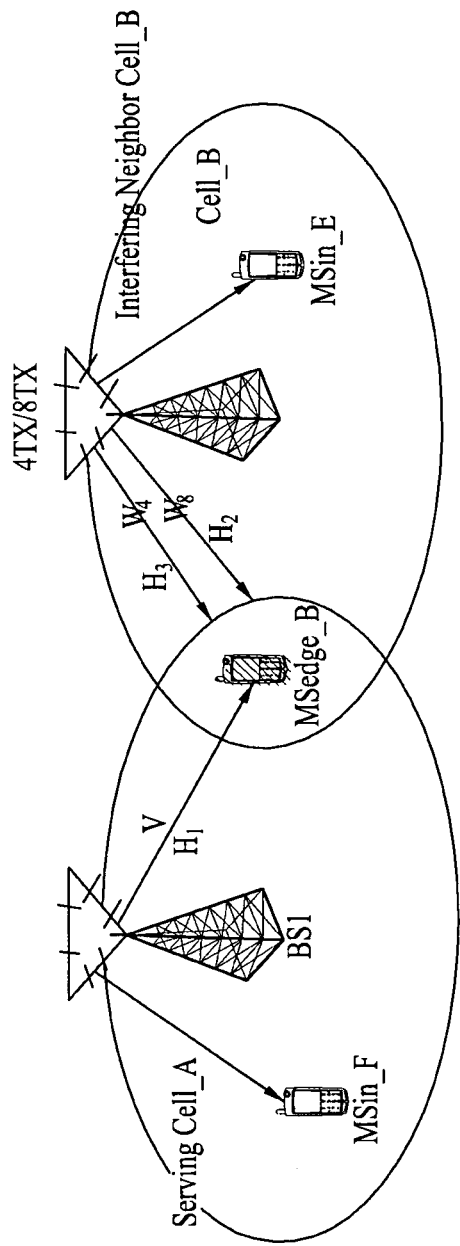
FIG. 2 illustrates an example of PMI restriction/recommendation scheme with 8Tx physical antennas in the interfering neighbor cell considering 4Tx legacy users according to one embodiment of the present invention.

FIG. 2 illustrates an example of PMI restriction/recommendation scheme with 8Tx antennas in the interfering neighbor cell considering 4Tx legacy users in accordance with one embodiment of the present invention.

Referring to FIG. 2, an interfering neighbor ABS 3 which is located adjacent to a serving ABS 1 supports both YMSs and AMSs. That is, the ABS 3 uses a precoder w4 when the ABS transmits data using 4Tx antennas (e.g., data transmission to YMSs), and the ABS 3 uses a precoder w8 when the ABS transmits data using 8Tx antennas. The serving ABS 1 may support AMSs only or both the YMSs and AMSs.

Assume that a precoder used by the serving ABS 1 is 'v', a channel matrix which indicates channel state between the serving ABS 1 and MS B is '$H_1$'. It is further assumed that data transmitted from the ABS 3 using the precoder w4 arrives at the cell edge region through the channel indicated by a channel matrix $H_3$, and data transmitted from the ABS 3 using the precoder w8 arrives at the cell edge region through the channel indicated by a channel matrix $H_2$, respectively.

At this time, in the standard of IEEE 802.16m, 8Tx is considered on the BS side as described above. Therefore, the precoder w8 has the size of an 8 by 8 matrix, and the precoder w4 has the size of a 4 by 4 matrix.

Under above described assumption about the network topology of the BSs and MSs, a precoder (PMI) which will be fed back to the serving BS from the MS B for the PMI restriction in the interfering neighbor cell can be determined as following Equation 1.

$$\hat{w}_8 = \underset{w_8}{\operatorname{argmax}} |v^H H_1^H H_2 w_8|^2 \qquad \text{[Equation 1]}$$

Where $\hat{w}_8$ is the determined PMI for 8Tx which could be fed back to restrict in the neighbor cell.

Referring to Equation 1 above, the MS can obtain the precoder $\hat{w}_8$ which causes the most severe interference with the precoder v of the serving ABS under given channel status.

Meanwhile, there may exist some legacy users (i.e., YMSs) which are served by 4Tx. While the YMSs should also be considered in the present embodiment, a method for obtaining the precoder for 4Tx which causes interferences with the precoder v used by the serving ABS is provided as following Equation 2.

$$\hat{w}_4 = \underset{w_4}{\mathrm{argmax}} |v^H H_1^H H_3 w_4|^2 \quad \text{[Equation 2]}$$

Where $\hat{w}_4$ is the determined PMI for 8Tx which could be fed back to restrict in the neighbor cell.

Referring to Equation 2 above, the MS can obtain the precoder $\hat{w}_4$ which causes the most severe interference with the precoder of the serving ABS v under given channel status.

However, only the precoders for 8Tx is fed back to the serving ABS from the MS according the PMI restriction feedback scheme of the present embodiment. Accordingly, precoder $\hat{w}_4$ for 4Tx can be obtained by the interfering BS using the precoder $\hat{w}_8$ received from the serving ABS as following Equation 3.

$$w_8 \approx C w_4 \quad \text{[Equation 3]}$$

Where C is a pre-determined virtual matrix which satisfies Equation 3.

Here, the virtual matrix C may be shared between the MSs and the BSs in advance.

According to Equation 3, the interfering neighbor BS may obtain $\hat{w}_4$ by multiplying an inverse matrix of the virtual matrix C by $\hat{w}_8$.

However, only feeding back the determined PMI $\hat{w}_8$ is not enough for mitigating the interferences caused by neighbor BSs. This is because some other PMIs (i.e., $w_0, w_1, \ldots, W_m$) in the 8Tx codebook which has high correlation with $\hat{w}_8$ may also interfere the cell-edge user (e.g., MS B of FIG. 2). Thus, it is preferable to restrict an additional set of PMIs of 8Tx which includes PMIs having high correlation with $\hat{w}_8$.

Here, feeding back every index of precoders included in the set of PMI may cause significant signaling overhead because the size of feedback data in this case is directly proportional to the number of PMIs included in the set.

To solve the aforementioned overhead problem, according to the present invention, a method of PMI feedback can be carried out by including a PMI group index to feedback information along with $\hat{w}_8$.

The PMI group index according to the present invention can be determined by classifying PMIs which has high correlation with $\hat{w}_8$ in such a way that PMIs having the same correlation value with $\hat{w}_8$ are assigned to a PMI group.

For reporting a set of PMIs, the following procedure shall be performed at the MS after determining the restricted PMI $\hat{w}_8$.

First, the MS may obtain $\hat{w}_8$ through the operation of Equation 1. Here, assume that the rank-1 DL base codebook C(8, 1,4, m) for m=0 to 15 with 8Tx is applied to MSs and BSs. That is, the codebook with 16 precoders are applied and PMIs in the codebook can be expressed as ($w_0, w_1, \ldots, w_m$).

The MS may AMS calculates the cross correlation of each PMI to the restricted PMI $\hat{w}_8$. The cross-correlation between PMIs can be defined as Equation 4.

$$\rho_{i,k} = |w_i^H \times w_k| \quad \text{[Equation 4]}$$

Where i=1, . . . , N, and $w_k$ is a PMI which corresponds to $\hat{w}_8$.

N correlation values ($\rho_1$, k . . . $\rho_{N,k}$) can be obtained as a result of the operation which is carried out by substituting 1 to N (here, N is 16 since m=0 to 15) for i' value of Equation 4. As a result The obtained N correlation values can be sorted in descending order and then renamed as $r_1 \ldots r_N$.

The consequence of the above operations can be expressed as following Equation 5.

$$r_1 = \rho_{k,k} = 1 > r_2 = \ldots = r_{n_1} > r_{n_1+1} = \ldots = r_{n_2} > r_{n_2+1} = \ldots$$
$$= r_{n_3} > \ldots > r_N$$

Where $w_k$ represents r1.

Referring to Equation 5, PMIs having the same cross-correlation value may constitute a correlation level group. Consequently, two PMI level groups can be obtained by classifying PMIs having the same cross-correlation value with $r_{n1}$ to Level 1 group and PMIs having the same cross-correlation value with $r_{n2}$ to Level 2 group respectively. Here, the level 1 group represents a group of PMIs having the biggest cross-correlation value with $w_k$, and the level 2 group represents a group of PMIs having the second-biggest cross-correlation value with $w_k$.

Namely, the AMS determines the size of the PMI level group to be jointly restricted, based on two fixed correlation levels determined by $n_1$ and $n_2$ in Equation 5.

Accordingly, in a case where restricting PMIs included in the level 1 group is enough to mitigate the interference, the AMS may add one bit information which is set to a specific value (e.g., '0b0') indicating the level 1 group to the feedback information along with $w_k$.

On the other hand, in a case where restricting PMIs included in both the level 1 and level 2 group is required to mitigate the interference, the AMS may add one bit information which is set to a specific value (e.g., '0b1') indicating both the level 1 and level 2 group to the feedback information along with $w_k$.

Consequently, two level groups of PMIs can be selectively restricted with minimum signaling overhead by adding one bit information to the feedback information.

In the following description of this disclosure, bit information indicating the level 1 group or both the level 1 and level 2 group can be named 'subset bit'.

The subset bit can be transmitted via a pre-determined field (e.g., PMI_coordination_subset field) included in a feedback header. The PMI_coordination_subset field may be configured as following Table 1.

TABLE 1

| PMI_coordination_subset | Value |
|---|---|
| 0b0 | $n_1$ |
| 0b1 | $n_2$ |

Referring to Table 1, the value of PMI_coordination_subset field may be set to 0b0 when PMIs belonging to a level 1 group which correspond to n1 should be restricted. The value of PMI_coordination_subset field may be set to 0b1 when PMIs belonging to level 2 group which correspond to n2 as well as level 1 group should be restricted.

More detailed example of the above-described feedback method according to one embodiment of the present invention will be described with reference to FIG. 3.

Figure 3:
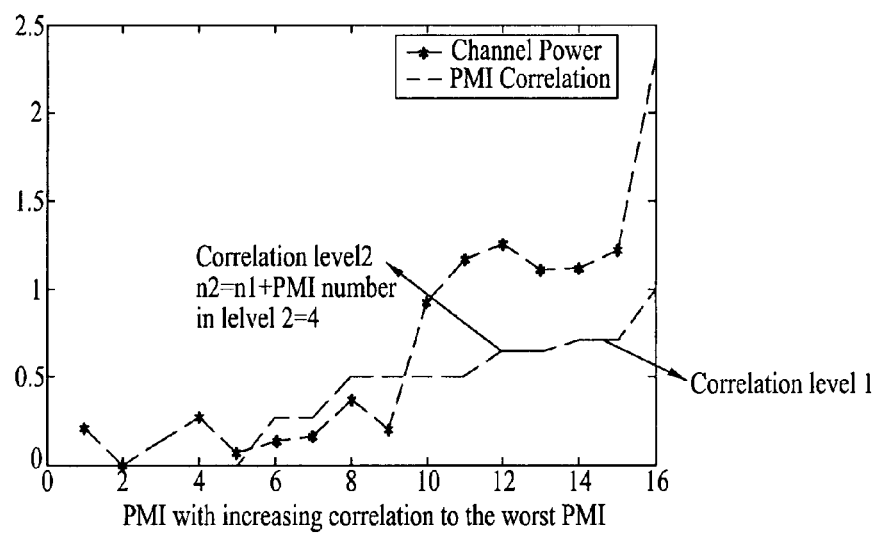
FIG. 3 illustrates an example of a relationship between channel power and PMI correlation according to one embodiment of the present invention.

FIG. 3 is a diagram illustrating an example of relationship between channel power and PMI correlation.

Referring to FIG. 3, $w_k$ which corresponds to $\hat{w}_8$ occupies PMI 16 (the worst PMI) on the horizontal axis, and the remaining 15 PMIs are sorted in descending order of correlation value as Equation 5 and then sequentially placed on the horizontal axis.

Assume that the correlation value of PMI 16 is '1', PMI 14 and PMI 15 are the PMIs with the highest correlation value to the PMI 16 and constitute the PMI level 1 group. PMI 12 and PMI 12 are the PMIs with the second-highest correlation value to the PMI 16 and constitute the PMI level 2 group.

In this case, since the PMIs included in both the level 1 group 1 and the level 2 group have relatively high correlation to PMI 16, it is preferable that the AMS sets the subset bit to the value indicates the level 2 group. This way, the PMIs included in both the level 1 group 1 and the level 2 group can be fed back to restricted in neighbor cells.

Figure 4:
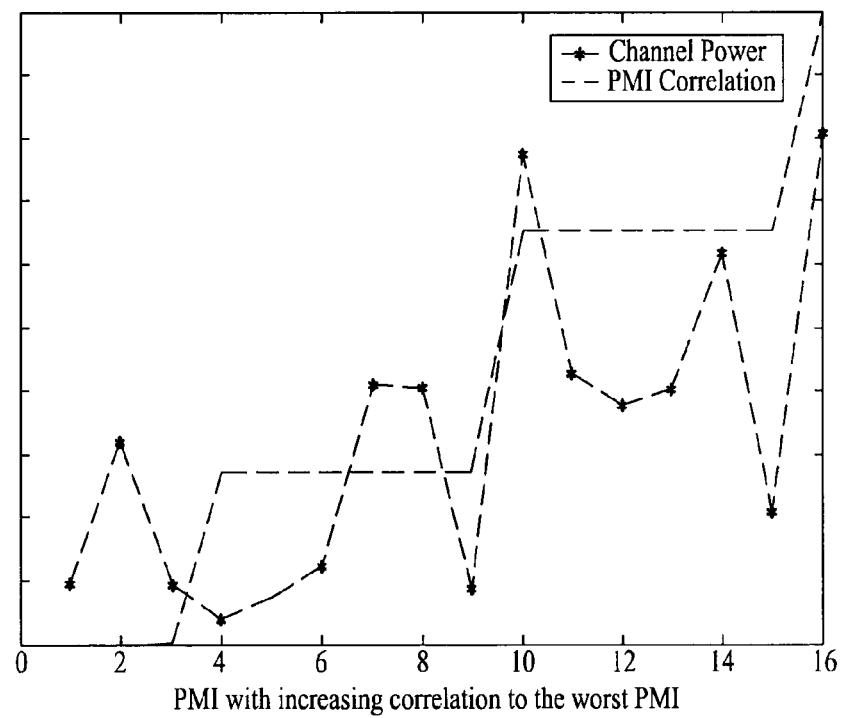
FIG. 4 illustrates another example of a relationship between channel power and PMI correlation according to one embodiment of the present invention.

FIG. 4 is a diagram illustrating another example of relationship between channel power and PMI correlation.

Although FIG. 3 illustrates the case where the number of PMIs included in the level 1 is 2, FIG. 4 illustrated a case where the number of PMIs included in the level 1 is 6. Further, correlation value of level 2 group to the PMI 16 is approximately 0.3, which shows relatively low than the case of FIG. 3, thus the PMIs included in the level 2 group do not need to be restricted in the neighbor cells.

In this case, the AMS can feed back 6 PMIs with high correlation to the PMI 16, which may cause severe interferences, at once by setting the subset bit to a value indicating the level group 1 to restrict in the neighbor cells.

Meanwhile, in the present invention, cases where legacy MSs (YMSs) served by 4Tx using $w_4$ should be considered.

Although the approximated value of $\hat{w}_4$ can be obtained by carrying out the operation of Equation 3 without feedback for 4Tx, it is also necessary for AMSs to feedback the cross-correlation level of 4Tx so that the PMI restriction could be more accurate because the difference of 8Tx and 4Tx codebooks.

Based on the calculation as $\|H_3 w_4\|^2$, the AMS can determine the number of correlation levels of PMIs in 4Tx codebook to restrict according to the same calculation as in Equation 4 and Equation 5.

In case of 4Tx, similar to n1 and n2 in the case of 8Tx, two cross-correlation levels for 4Tx codebook as $m_1$ and $m_2$ can be obtained. Accordingly, the size of a subset bit for 4Tx can be determined to be 1 bit, and the AMS indicates the selection of $n_i$ and $m_j$ (i,j=1 or 2) set via PMI_coordination_subset in a feedback header.

Consequently, the subset bit can have the total size of the 2 bits and be configured as following Table 2.

TABLE 2

| PMI_coordination_subset | Value |
|---|---|
| 0b00 | $n_1 m_1$ |
| 0b01 | $n_2 m_1$ |
| 0b10 | $n_1 m_2$ |
| 0b11 | $N_2 m_2$ |

Referring to Table 2, the PMIs should be restricted in the neighbor cells can be fed back to the serving BS with low signaling overhead via a bitmap with the size of 2 bits, where each bit indicates 4Tx PMI level group and 8Tx PMI level group respectively.

The feedback method of PMI restriction according to one embodiment of the present invention has been described as above. However, the present invention is not limited to this method, and may also be applied to a feedback method of PMI recommendation.

For example, a precoder which causes minimum interference with the precoder of serving cell can be obtained by substituting 'argmax' of Equation 1 and Equation 2 with 'argmin'. And the AMS can feed back a PMI subset information including the PMIs having high correlation to the precoder with the precoder which causes minimum interference with the precoder of serving cell.

According to another embodiment of the present invention, a mobile station and base station (FBS, MBS), on which the above described embodiments of the resent invention can be performed, are explained as follows.

First of all, a mobile station works as a transmitter in uplink and is able to work as a receiver in downlink. A base station works as a receiver in uplink and is able to work as a transmitter in downlink. In particular, each of the mobile station and the base station can include a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of these transmitting and receiving sides are explained with reference to FIG. 5 as follows.

Figure 5:
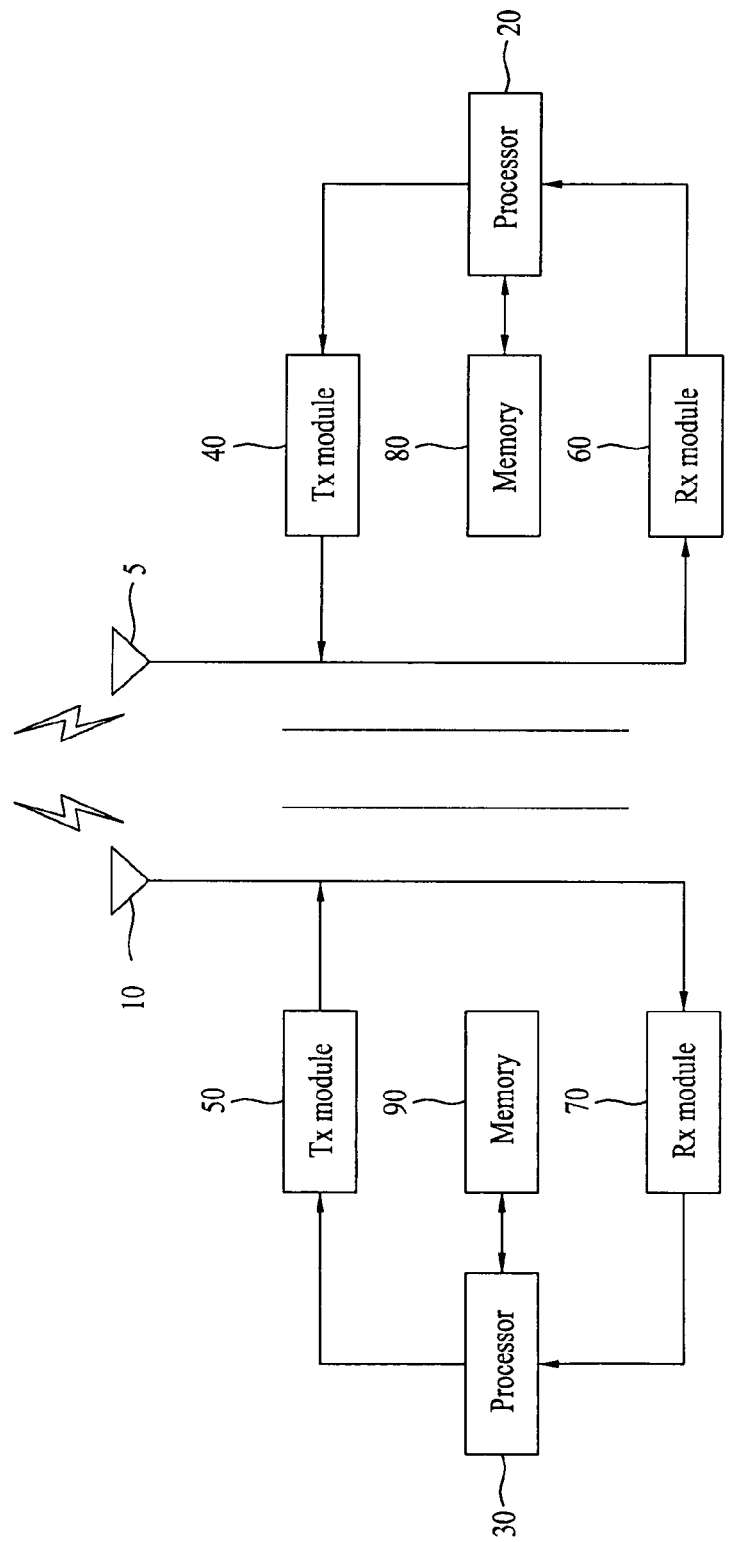
FIG. 5 is a block diagram for an example of a transmitting and receiving side structure according to another embodiment of the present invention.

FIG. 5 is a block diagram for an example of a transmitting and receiving side structure according to another embodiment of the present invention. Referring to FIG. 5, a left side shows a structure of a transmitting side and a right side shows a structure of a receiving side. The transmitting/receiving side can include an antenna 5/10, a processor 20/30, a transmitting (Tx) module 40/50, a receiving (Rx) module 60/70 and a memory 80/90. Each of the elements can perform a corresponding function. The respective elements are explained in detail as follows.

First of al, the antenna 5/10 performs a function of transmitting a signal generated by the Tx module 40/50 externally or a function of receiving a radio signal externally and then delivering the received radio signal to the Rx module 60/70. If MIMO function is supported, at least two antennas can be provided.

The antenna, Tx module and Rx module can configure a radio communication (RF) module.

The processor 20/30 basically controls overall operations of components of the transmitting side and receiving side. For example, the processor is able to control the processes of above-described PMI feedback method according to one embodiment of the present invention.

In particular, the processor of a mobile station is able to determine a precoder which causes the most severe interference with the precoder of a serving cell, that is, a precoder to be restricted from being used in neighbor cells.

Further, the processor of the mobile station is able to determine PMIs having high correlation to the precoder which causes the most severe interference with the precoder of the serving cell and divide them into one or more PMI level groups according to cross-correlation values thereof. Then, the processor may set subset bit to a value which corresponds to a PMI group to be restricted in the neighbor cells and transmit a feedback header including subset bit along with the precoder which causes the most severe interference to the serving BS by controlling a radio frequency (RF) module. Here, for legacy MSs served by 4Tx, the processor may additionally include another subset bit for 4Tx PMI group, which need to be restricted in the neighbor cells, to the feedback header.

Also, the processor of the base station may transmit the PMI subset information received by the MS via an RF module to the neighbor cells, so that the PMIs included in the PMI subset information can be restricted in the neighbor cells.

The Tx module 40/50 performs prescribed coding and modulation on data, which is scheduled to be externally transmitted by the processor 20/30, and is then able to deliver the coded and modulated data to the antenna 10/5.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data (e.g., sleep mode information according to reference synchronization information, etc.). Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

The invention claimed is:

1. A method of codebook based precoding matrix index (PMI) feedback considering legacy mobile stations in a multi-cell wireless communication system, the method comprising:
   measuring a channel from at least one neighboring base station generating interference with a signal received from a serving base station;
   determining a first PMI in which the interference is maximized from PMIs included in a first codebook, wherein the first PMI is determined based on the measured channel;
   determining a first PMI group including PMIs having high correlation to the first PMI from the PMIs included in the first codebook;
   determining a second PMI in which the interference is maximized from PMIs included in a second codebook, where in the second codebook is for the legacy mobile stations;
   determining a second PMI group including PMIs having high correlation to the second PMI from the PMIs included in the second codebook; and
   transmitting feedback information including the first PMI, a first subset bit indicating the first PMI group, the second PMI and a second subset bit indicating the second PMI group to the serving base station.

2. The method according to claim 1, wherein the second PMI is determined based on the measured channel.

3. The method according to claim 1, wherein the second PMI is determined based on calculation as Equation a below, $$W_8 \approx C w_4 \quad [\text{Equation a}]$$

where $W_8$, $W_4$ and C indicate the first PMI, the second PMI and a pre-determined virtual matrix, respectively.

4. The method according to claim 1, wherein determining the first PMI group comprising:
   calculating respective first cross-correlation values between the first PMI and the PMIs included in the first codebook;
   determining n1 level group and n2 level group based on the cross-correlation calculation, wherein the n1 level group includes PMIs having the largest cross-correlation value and wherein the n2 level group includes PMIs having the second largest cross-correlation value; and
   determining the first PMI group by including the n1 level group only or both the n1 level group and the n2 level group based on the first cross-correlation calculation.

5. The method according to claim 4, wherein determining the second PMI group
   comprising:
   calculating respective second cross-correlation values between the second PMI and the PMIs included in the second codebook;
   determining m1 level group and m2 level group based on the cross-correlation calculation, wherein the m1 level group includes PMIs having the largest cross-correlation value and wherein the m2 level group includes PMIs having the second largest cross-correlation value; and
   determining the second PMI group by including the m1 level group only or both the m1 level group and the m2 level group based on the second cross-correlation calculation.

6. The method according to claim 5, wherein the first subset bit and the second subset bit are included in a PMI_coordination subset field of a feedback header.

7. The method according to claim 6, wherein the first subset bit is set to '0' if only the n1 level group is included in the first PMI group, and
   wherein the first subset bit is set to '1' if both the n1 level group and the n2 level group are included in the first PMI group.

8. The method according to claim 7, wherein the second subset bit is set to '0' if only the m1 level group is included in the second PMI group, and
   wherein the second subset bit is set to '1' if both the m1 level group and the m2 level group are included in the second PMI group.

9. The method according to claim 8, wherein the first subset bit and the second subset bit are included in the PMI_coordination subset field as a bitmap information.

10. A method of codebook based precoding matrix index (PMI) feedback for a serving base station considering legacy mobile stations in a multi-cell wireless communication system, the method comprising:

receiving feedback information including a first PMI, a first subset bit indicating a first PMI group, a second PMI and a second subset bit indicating a second PMI group from a mobile station; and transmitting the feedback information to at least one neighboring base station, wherein the first PMI is a PMI in which channel interference between the serving base station and the at least one neighboring base station is maximized among PMIs included in a first codebook, and the second PMI is a PMI in which the interference is maximized among PMIs included in a second codebook for the legacy mobile stations, and wherein the first PMI group includes PMIs having high correlation to the first PMI among the PMIs included in the first codebook, and the second PMI group includes PMIs having high correlation to the second PMI among the PMIs included in the second codebook.

11. The method according to claim 10, wherein the second PMI is determined based on calculation as Equation a below, $$W_8 \approx C w_4 \qquad \text{[Equation a]}$$

where $W_8$, $W_4$ and C indicate the first PMI, the second PMI and a pre-determined virtual matrix, respectively.

12. A mobile station that supports codebook based precoding matrix index (PMI) feedback in a multi-cell wireless communication system, the mobile station comprising:

a processor; and a radio frequency (RF) module for transmitting and receiving a radio signal to and from the outside under the control of the processor, wherein the processor is configured to:

measure a channel from at least one neighboring base station generating interference with a signal received from a serving base station;

determine a first PMI in which the interference is maximized from PMIs included in a first codebook, wherein the first PMI is determined based on the measured channel;

determine a first PMI group including PMIs having high correlation to the first PMI from the PMIs included in the first codebook;

determine a second PMI in which the interference is maximized from PMIs included in a second codebook, wherein the second codebook is for the legacy mobile stations;

determine a second PMI group including PMIs having high correlation to the second PMI from the PMIs included in the second codebook; and control the RF module to transmit feedback information including the first PMI, a first subset bit indicating the first PMI group, the second PMI and a second subset bit indicating the second PMI group to the serving base station.

13. The mobile station according to claim 12, wherein the processor determines the second PMI based on calculation as Equation a below, $$W_8 \approx C w_4 \qquad \text{[Equation a]}$$

where $W_8$, $W_4$ and C indicate the first PMI, the second PMI and a pre-determined virtual matrix, respectively.

14. The mobile station according to claim 12, wherein the processor is further configured to:

calculate respective first cross-correlation values between the first PMI and the PMIs included in the first codebook;

determine n1 level group and n2 level group based on the cross-correlation calculation, wherein the n1 level group includes PMIs having the largest cross-correlation value and wherein the n2 level group includes PMIs having the second largest cross-correlation value; and determine the first PMI group by including the n1 level group only or both the n1 level group and the n2 level group based on the first cross-correlation calculation.

15. The mobile station according to claim 14, wherein the processor is further configured to:

calculate respective second cross-correlation values between the second PMI and the PMIs included in the second codebook;

determine m1 level group and m2 level group based on the cross-correlation calculation, wherein the m1 level group includes PMIs having the largest cross-correlation value and wherein the m2 level group includes PMIs having the second largest cross-correlation value; and determine the second PMI group by including the m1 level group only or both the m1 level group and the m2 level group based on the second cross-correlation calculation.

16. The mobile station according to claim 15, wherein the first subset bit and the second subset bit are included in a PMI_coordination subset field of a feedback header.

17. The mobile station according to claim 15, wherein the processor sets the first subset bit to '0' if only the n1 level group is included in the first PMI group, and wherein the processor sets the first subset bit to '1' if both the n1 level group and the n2 level group are included in the first PMI group.

18. The mobile station according to claim 17, wherein the processor sets the second subset bit to '0' if only the m1 level group is included in the second PMI group, and wherein the processor sets the second subset bit to '1' if both the m1 level group and the m2 level group are included in the second PMI group.

19. The mobile station according to claim 17, wherein the first subset bit and the second subset bit are included in the PMI_coordination subset field as a bitmap information.

* * * * *